Nov. 5, 1929. E. W. DAVIS 1,734,288
LUBRICATING FITTING
Filed Sept. 28, 1923
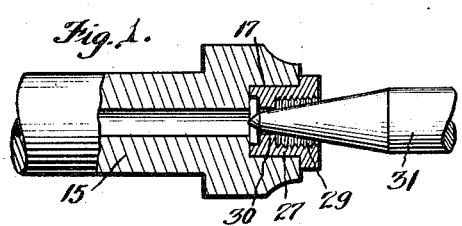
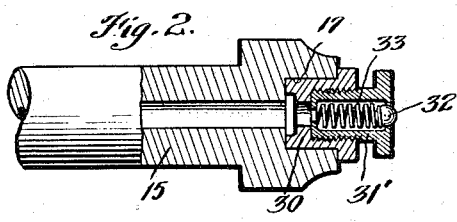
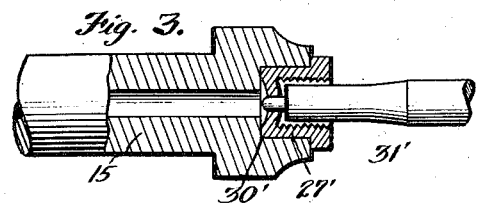
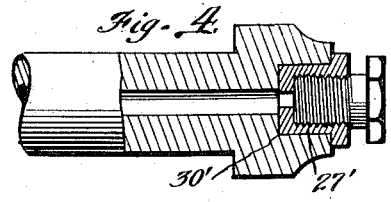
Inventor
Ernest W. Davis Patented Nov. 5, 1929

1,734,288

UNITED STATES PATENT OFFICE.

ERNEST W. DAVIS, OF OAK PARK, ILLINOIS, ASSIGNOR TO ALEMITE CORPORATION, OF CHICAGO, ILLINOIS, A CORPORATION OF DELAWARE

LUBRICATING FITTING

Application filed September 28, 1923. Serial No. 665,353.

My invention relates to lubricating fittings and a method of securing such fittings to the bearings of an automobile or other mechanism.

The objects of my invention are to provide a lubricating fitting of such construction that it can be easily and quickly attached to a bearing to be lubricated in such a manner as to substantially avoid the possibility of it subsequently becoming loosened and lost from the mechanism to which it is attached.

Another object of my invention is to provide a simple method of attaching lubricating fittings to the bearings to which they are to supply lubricant.

The above and other objects of my invention will appear as this description progresses, reference being had to the accompanying drawings, in which Figure 1 is a longitudinal section through a shackle bolt and one part of a two-part fitting. This view illustrates the method of securing the outer part of the two-part fitting to the shackle bolt;

Figure 2 is a view similar to Figure 1, but showing the second part of the fitting secured to the first part;

Figures 3 and 4 are views similar to Figures 1 and 2, respectively.

Throughout the several views similar reference characters will be used for referring to similar parts.

The particular lubricating fittings which I have illustrated herein are designed to form part of a well-known high pressure lubricating system which comprises a plurality of fittings, each of which is adapted to be secured to one of the bearings of the mechanism to be lubricated. Lubricant is successively supplied to the various fittings by means of a high pressure compressor, the discharge conduit of which is provided with means for successively making sealed connection with each of the fittings, so that lubricant under high pressure can be forced thereinto, and thus into the bearings. Ordinarily, such fittings are provided at one end with threaded portions adapted to be screwed into correspondingly threaded openings in the bearings to be lubricated. In some cases, it has been found that this method of securing the fittings to the bearings is undesirable, and one of the objects of this invention, as stated above, is to provide simple and economical means and method of securing such fittings to the various bearings which are to be lubricated.

The inner ends of fittings used in lubricating systems of the character described above are subjected to the full pressure of the lubricant, which sometimes amounts to several thousand pounds per square inch, and unless they are securely fastened to the bearings, this pressure is sufficient to force them out of the openings in which they are secured. Consequently, the means which I have invented for securing such fittings in place must be of such a character as will successfully withstand the pressures imposed thereon.

Throughout the several views, I have illustrated my invention in connection with a shackle bolt 15 having a head 16 at one end, which is provided with an enlarged bore 17, communicating with the bore 18 of the shackle bolt.

In the construction shown in Figures 1 and 2 the bore of the sleeve 27 is provided with screw threads 29 and also with an inwardly extending annular flange 30. The part of the fitting just described can be easily forced into the bore 17, and if a center punch 31 is then inserted in the opening of the flange 30 as shown in Figure 1 and struck, it will expand the flange 30 and the portions of the fitting lying outside of this flange so that the outer portions of the sleeve 27 adjacent the flange 30 will be forced into tight contact with the walls of the bore 17. Thereupon, the second part 31' of the fitting which is externally threaded as shown in Figure 2, can be screwed into the part just described, as shown in Figure 2.

It should be understood that all of the fittings shown herein are preferably provided with a ball closure 32 yieldingly held in its closed position by means of a suitable spring 33.

The form of my invention illustrated in Figures 3 and 4 is very similar to that shown in Figures 1 and 2, except that the inwardly extending annular flange 30' is initially convexed outwardly as shown in Figure 3, so that when a suitable end punch 31' is inserted and forced inwardly, it will flatten the convexed portion of the flange 30' down to the position shown in Figure 4, thereby forcing the outer sides of the sleeve 27' into contact with the walls of the bore 17.

From the above description, it will be apparent that I have devised an exceedingly simple fitting and a correspondingly simple method of securing it to a bearing to be lubricated, and that any one of the several fittings illustrated can be easily and quickly attached to a bearing. While I have described the details of construction of the preferred embodiment of my invention, it is to be clearly understood that my invention is not limited to these details of construction, but is capable of other adaptations and modifications within the scope of the appended claims.

Having thus described my invention, what I claim is:—

1. A two-part lubricant receiving fitting adapted to be secured into the oil hole of a bearing, comprising a bushing member having an outer cylindrical surface substantially conforming to the oil hole of the bearing to which it is to be secured, said bushing having a centrally perforated convex end wall, said wall being adapted to be deformed thereby to expand the end portion of the cylindrical wall into tight frictional engagement with the walls of the oil hole of the bearing, a fitting having means for making a detachable connection with a lubricant supply source, and cooperating attaching means on said bushing and fitting.

2. Means for making an unthreaded oil hole of a bearing available for high pressure lubrication, comprising a bushing having an internal bore and an external wall substantially conforming to the oil hole of the bearing to which it is applied, a shoulder on said bushing to limit the depth to which said bushing may be forced into the oil hole, an annular shoulder projecting into the bore of said bushing, said wall being adapted to be forced radially outwardly thereby to expand the end portion of said bushing into tight frictional engagement with the walls of the oil hole, a fitting for making a quick detachable connection with the coupler of a high pressure lubricant compressor, and cooperating securing means on said fitting and bushing.

In witness whereof, I hereunto subscribe my name this 26 day of September, 1923.

ERNEST W. DAVIS.